United States Patent [19]
McKinney et al.

[11] Patent Number: 6,032,457
[45] Date of Patent: *Mar. 7, 2000

[54] FUEL NOZZLE GUIDE

[75] Inventors: Randal G. McKinney, Ellington; Franklin J. Davis, Glastonbury, both of Conn.

[73] Assignee: United Technologies Corporation, Hartford, Conn.

[*] Notice: Under 35 U.S.C. 154(b), the term of this patent shall be extended for 617 days.

[21] Appl. No.: 08/671,463

[22] Filed: Jun. 27, 1996

[51] Int. Cl.$^7$ ................................ F02C 7/12; F02C 7/22
[52] U.S. Cl. .............................. 60/39.31; 60/740; 60/756
[58] Field of Search .......................... 60/39.31, 39.32, 60/740, 748, 752, 756; 415/914

[56] References Cited

U.S. PATENT DOCUMENTS

| | | | |
|---|---|---|---|
| 3,273,343 | 9/1966 | Cretella | 60/39.72 |
| 3,451,215 | 6/1969 | Barr | 60/39.14 |
| 3,589,127 | 6/1971 | Kenworthy et al. | 60/39.37 |
| 4,322,945 | 4/1982 | Peterson et al. | 60/39.32 |
| 4,365,470 | 12/1982 | Matthews et al. | 60/39.32 |
| 4,525,996 | 7/1985 | Wright et al. | 60/39.31 |
| 4,686,823 | 8/1987 | Coburn et al. | 60/39.32 |
| 4,870,818 | 10/1989 | Suliga | 60/740 |
| 4,934,145 | 6/1990 | Zeisser | 60/756 |
| 4,999,996 | 3/1991 | Duchene et al. | 60/39.32 |
| 5,157,914 | 10/1992 | Schwarz et al. | 60/39.29 |
| 5,222,358 | 6/1993 | Chaput et al. | 60/39.32 |
| 5,255,508 | 10/1993 | Davis | 60/39.32 |
| 5,419,115 | 5/1995 | Butler et al. | 60/39.36 |
| 5,430,935 | 7/1995 | Yaworsky et al. | 29/889.1 |
| 5,463,864 | 11/1995 | Butler et al. | 60/39.31 |

*Primary Examiner*—Louis J. Casaregola

[57] ABSTRACT

Disclosed is a fuel nozzle guide for use in gas turbine engines. The nozzle guide comprising an annular bushing sized for receiving a fuel nozzle, wherein the bushing has a first end and a second end, the first end being connected to a nozzle guide retainer. A flange extends radially from the second end of the bushing, wherein the flange has a proximal portion spaced proximal to the bushing, and a distal portion spaced distal from the bushing. The distal portion of the flange extends substantially parallel to a combustion chamber bulkhead heat shield. A plurality of radially extending ribs are disposed about the distal portion of the flange, each of the ribs having leading ends and trailing ends, wherein the trailing ends are arcuate in shape, thereby facilitating a reduction in film cooling air vortices as film cooling air passes between the ribs, and thereby assisting in the cooling of the bulkhead heat shield.

15 Claims, 4 Drawing Sheets

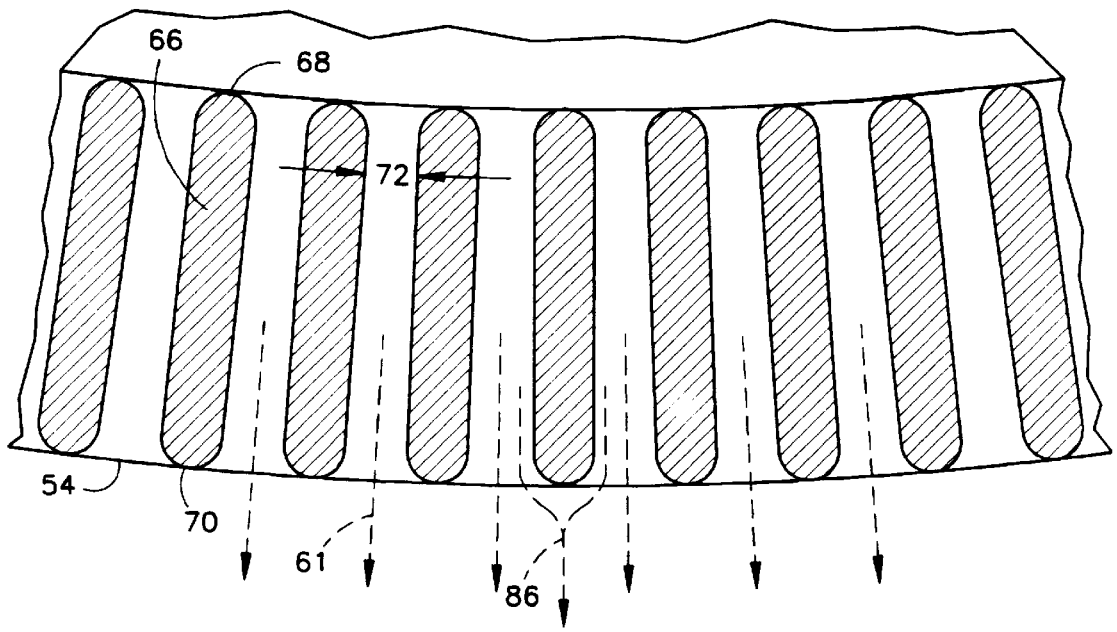
FIG.4
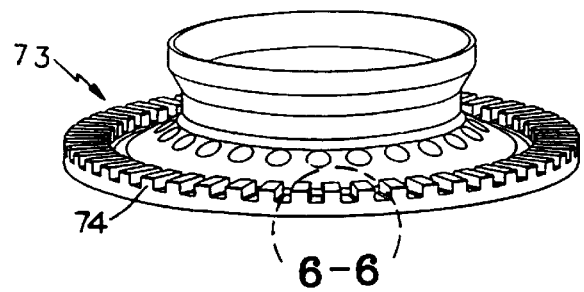
FIG.5 PRIOR ART
FIG.6 PRIOR ART
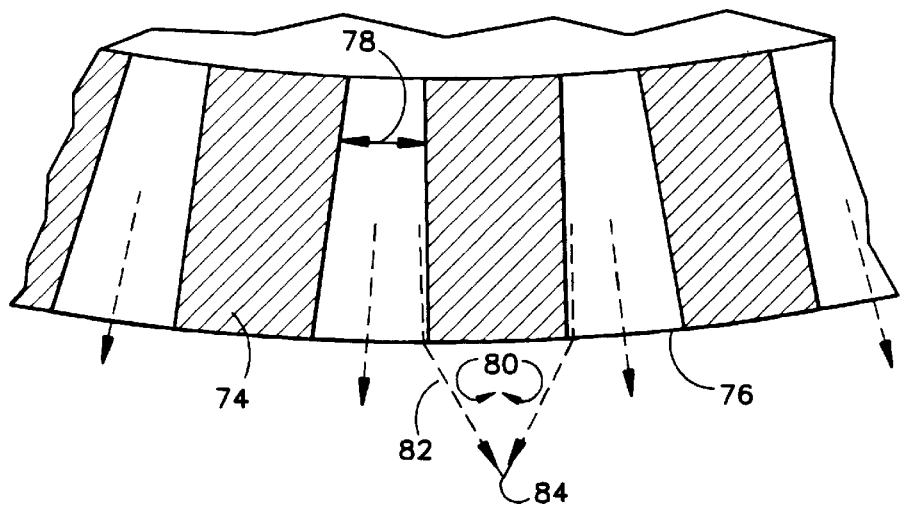

FUEL NOZZLE GUIDE

TECHNICAL FIELD

This invention relates generally to fuel nozzle guides for use in gas turbine engines, and more particularly, to a fuel nozzle guide for improving bulkhead film cooling.

BACKGROUND ART

Typically, gas turbine engine combustors include combustion chambers wherein air compressed by the engine's compressor, is mixed with fuel sprayed into the combustion chamber by a fuel nozzle which extends into the combustion chamber through a hole in the combustion chamber's bulkhead. The air-fuel mixture is burned, thereby increasing the kinetic energy of the airflow through the engine to produce useful thrust. An ignitor plug which functions similarly to a common spark plug in an automobile engine, provides an electrical spark which initiates the combustion.

To maintain the proper alignment of the fuel nozzle with the various other combustion chamber components such as the ignitor plug and various air inlet apertures, as well as to aid in the insertion of the nozzle into the combustion chamber for combustor assembly and maintenance, a multicomponent fuel nozzle guide which includes various cooling and combustion air apertures therein, is located in the hole in the combustion chamber wall through which the fuel nozzle extends.

It will be appreciated that the environment within a gas turbine engine combustion chamber is extremely harsh. The air fuel mixture burns in the combustion chamber at temperatures as high as 2100° C. (3800° F.) causing extreme thermal gradients in the combustion chamber walls. To protect the combustion chamber bulkhead from these thermal gradients, a bulkhead heat shield is disposed proximally to the bulkhead.

In order to ensure that the bulkhead heat shield does not experience thermal distress, film cooling air is guided over the bulkhead heat shield through a gap formed between the bulkhead heat shield and a radially projecting portion of the fuel nozzle guide. The spacing of this gap is maintained by means of the disposition of radially oriented ribs on a fuel nozzle guide flange. The ribs abut the bulkhead heat shield and in addition to maintaining the gap between the fuel nozzle guide and the bulkhead heat shield, serve to regulate the flow of film cooling air, and provide augmentation of the heat transfer surface area of the fuel nozzle guide.

In a typical fuel nozzle guide, there are approximately forty-eight (48) relatively thick ribs disposed about the circumference of the fuel nozzle guide flange, wherein the leading and trailing ends of the ribs are squared off. In this typical arrangement, each of the ribs has a width of approximately 0.1 inches and a radial length of 0.25 inches. Therefore, by using a known equation in the art for calculating aspect ratios (span$^2$/planform area), the typical rib in a fuel nozzle guide has an aspect ratio of 0.4. In addition, in the typical arrangement of these 48 ribs, each having an aspect ratio of 0.4, the leading ends of the ribs are separated from each other by a spacing of approximately 0.097 inches, while the trailing ends of the ribs are separated from each other by a spacing of approximately 0.075 inches.

A drawback in prior art fuel nozzle guides lies in the fact that these thick and squared-off ribs, combined with the spacing between the ribs, may facilitate the formation of strong vortices between film cooling jets as the film cooling flow exits the gap between the fuel nozzle guide and the bulkhead heat shield. These vortices may entrain hot gases from the combustion chamber and bring these hot gases in contact with the bulkhead heat shield, thereby possibly causing thermal distress under certain conditions.

One way to help alleviate the potential problem caused by these vortices in the prior art fuel nozzle guide is to increase cooling flow levels. However, it is known in the art that increasing cooling flow levels in the combustor upstream end increases the emissions of carbon monoxide and unburned hydrocarbons during engine operation at low power. These elevated emissions at low power are highly undesirable due to health and environmental considerations.

It is therefore an object of the present invention to provide a fuel nozzle guide that improves film cooling over the bulkhead heat shield without the need for increasing cooling flow levels.

Another object of the present invention is to provide a fuel nozzle guide that minimizes the formation of vortices between film cooling jets exiting the gap between the bulkhead heat shield and the fuel nozzle guide.

Yet another object of the present invention is to provide a fuel nozzle guide that facilitates improved cooling of the fuel nozzle guide by the cooling air.

DISCLOSURE OF THE INVENTION

These objects are achieved in the present invention, by a fuel nozzle guide for a gas turbine engine combustor featuring a plurality of radially extending ribs having arcuate trailing ends.

The combustor comprises a combustion chamber defined at one end thereof by a bulkhead having an opening, wherein the bulkhead is thermally insulated from the combustion chamber by a bulkhead heat shield. The bulkhead further comprises a fuel nozzle and fuel nozzle guide structure therefor and a retainer for securing the fuel nozzle and the fuel nozzle guide structure within the bulkhead opening.

The fuel nozzle guide comprises an annular bushing sized for receiving the fuel nozzle, wherein the bushing has a first end and a second end, the first end being connected to the retainer. A flange extends radially from the second end of the bushing, wherein the flange has a portion spaced proximally to the bushing, and a portion spaced distally from the bushing. The distal portion of the flange extends substantially parallel to the bulkhead heat shield. A plurality of radially extending ribs are disposed about the distal portion of the flange, each of the ribs having a leading end and trailing end, wherein the trailing ends are arcuate in shape, thereby minimizing the creation of film cooling air vortices as film cooling air passes between the ribs.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

FIG. 4 is a plan view, partly broken away, of ribs disposed about the fuel nozzle guide taken along circular section 4—4 of FIG. 3;

FIG. 5 is a perspective view of a prior art fuel nozzle guide; and

FIG. 6 is a plan view, partly broken away, of ribs disposed about the prior art fuel nozzle guide taken along circular section 6—6 of FIG. 5.

BEST MODE FOR CARRYING OUT THE INVENTION

Figure 1:
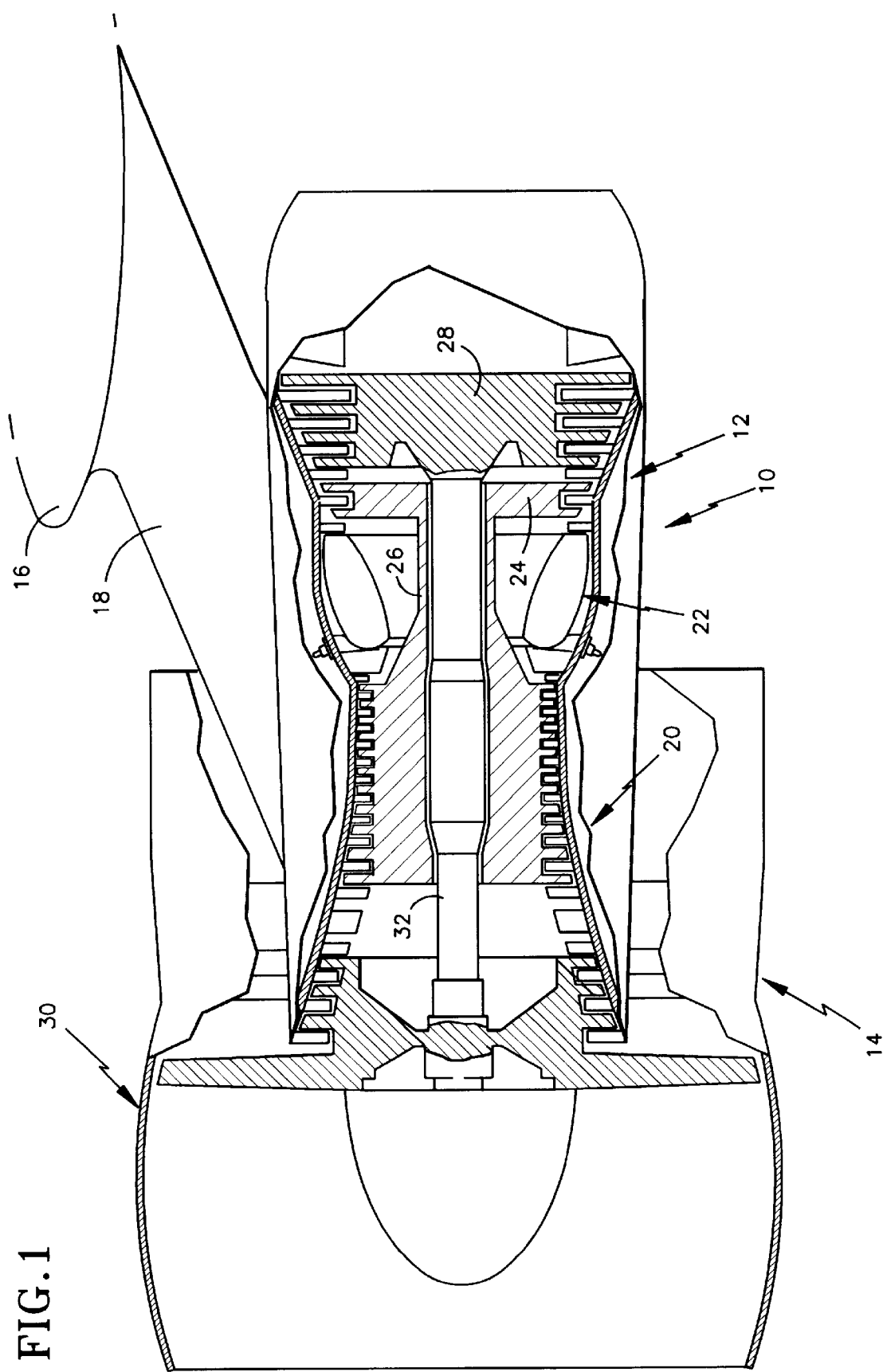
FIG. 1 is a side view, partly broken away, and partly in section, of a gas turbine power plant mounted onto an airplane wing.

Referring to FIG. 1, a gas turbine engine power plant 10 comprising an engine 12 disposed within a nacelle 14, is mounted on the wing 16 of an airframe (not shown) by pylon 18. As is well known in the art, engine 12 comprises a compressor 20 which receives ram air (not shown) through the inlet of the nacelle 14 and compresses that air, which is then ducted to combustor 22 where the air is mixed with fuel and the mixture ignited, thereby substantially increasing the kinetic energy of the airflow through the engine. The products of combustion of the burned air-fuel mixture are expelled from the combustor 22, impinging on the rotor blades of high pressure turbine 24 which is connected to the high pressure section of compressor 20 by axial drive shaft 26. The products of combustion from combustor section 22 also impinge upon the rotor blades of low pressure turbine 28 which connects to the low pressure section of compressor 20 and fan 30 by coaxial drive shaft 32 to provide a motive force for driving the compressor and fan. The total thrust provided by the power plant 10 is equal to the sum of the thrust of the exhaust of the engine 12 and the thrust associated with the air discharged by the fan 30. The foregoing description of the structure and operation of power plant 10 is, of course, well known in the art.

Figure 2:
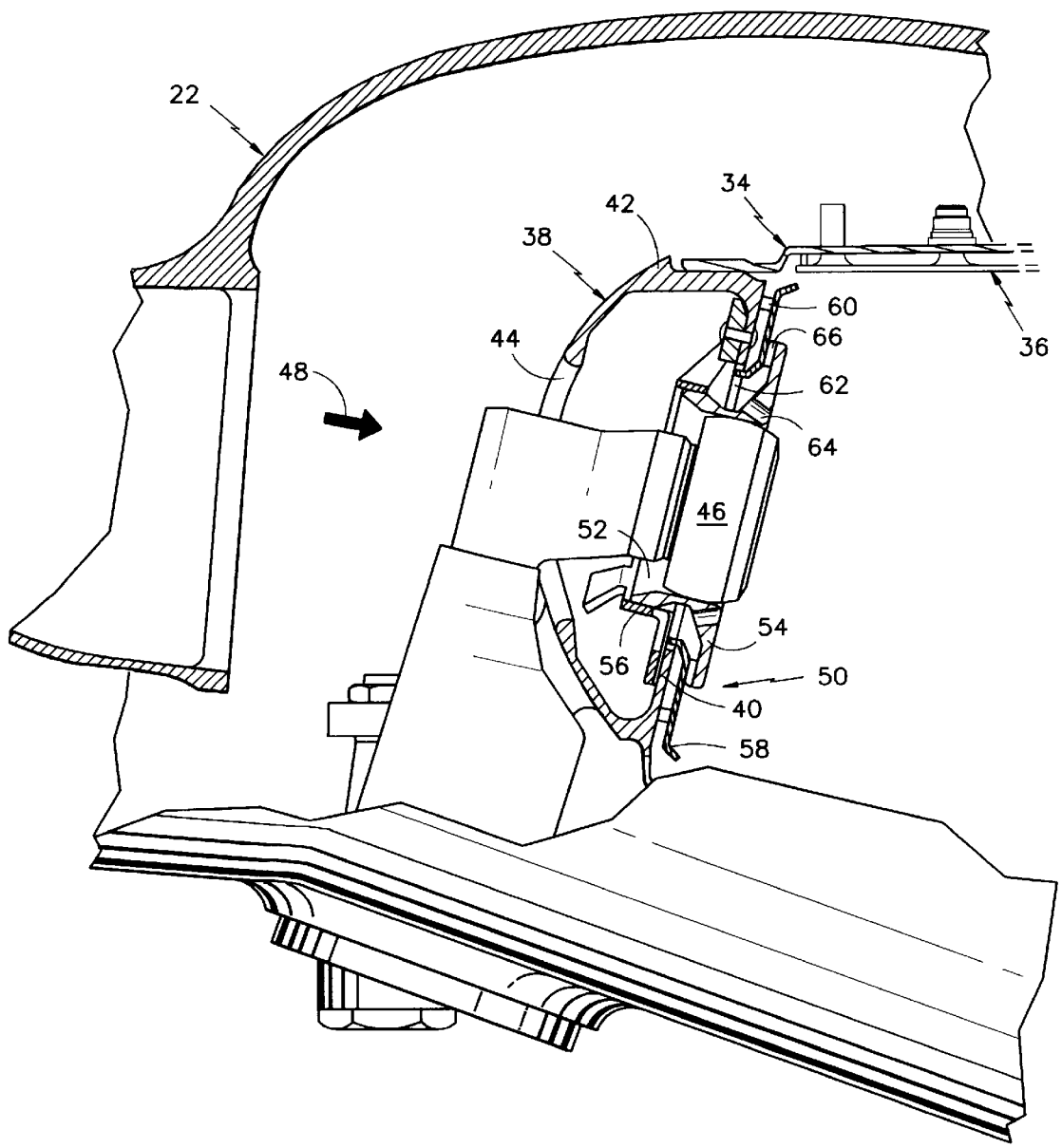
FIG. 2 is a sectional view of a combustor employing the fuel nozzle guide of the present invention.

Referring to FIG. 2, combustor 22 includes an annular combustion chamber 34 comprising a wall structure 36 terminating forwardly (with respect to the engine) at dome 38 including an integral, bulkhead 40 having a peripheral projection 42, and several openings, one of which is shown at 44, through which fuel nozzle 46 extends. Openings 44 also pass combustion air (indicated by arrow 48) to the interior of the combustor 22 to support the combustion of fuel provided by nozzle 46 and cool the combustor components. The fuel nozzle 46 is attached to bulkhead 40 by fuel nozzle guide structure 50.

Ignition of the mixture of air and fuel within the combustion chamber 34 upon engine startup is provided by an ignitor plug (not shown). Still referring to FIG. 2, as set forth hereinabove, the high temperatures occurring in the combustion chamber 34 cause the various components thereof to experience significant thermal transients and thermally induced differential expansion. Such differential expansion as well as vibration induced by gas flow through the combustor 22 can result in longitudinal and transverse displacement of the fuel nozzle 46 relative to bulkhead 40. Fuel nozzle guide structure 50 accommodates such differential displacement and vibration and aids in the assembly of the fuel nozzle 46 with the remainder of the combustion chamber 34.

Fuel nozzle guide structure 50 includes a nozzle guide bushing 52 disposed closely about, but spaced from, fuel nozzle 46 and extending longitudinally through a central opening in bulkhead 40. On the combustion chamber side of the bulkhead 40, nozzle guide bushing 52 terminates with radially extending flange 54.

As shown in FIG. 2, nozzle guide bushing 52 is retained relative to bulkhead 40 by an annular retainer structure 56. The retainer structure 56 may be of conventional design and may secure the nozzle guide bushing 52 using welding, threaded connectors, or a combination of threading and welding. Further details relating to one type of retainer structure 56 are provided in U.S. Pat. No. 5,463,864 assigned to United Technologies Corporation, the assignee of the present invention.

A radially extending annular heat shield 58 (generally, of the type disclosed in U.S. Pat. No. 4,934,145), is disposed between the radially extending flange 54 and the bulkhead 40, being spaced therefrom by a plurality of stand-offs 60. The heat shield 58 may be attached to the bulkhead 40 by clamping with nozzle guide bushing 52, or by means of welding and threaded fasteners (not shown).

Nozzle guide bushing 52 has an inner diameter substantially less than that of the opening in center of bulkhead 40. This defines an annular gap 62 therebetween for the admission of cooling and combustion air into the combustion chamber 34 via apertures 64 in the nozzle guide bushing 52 and the space between the heat shield 58 and the bulkhead 40.

Figure 3:
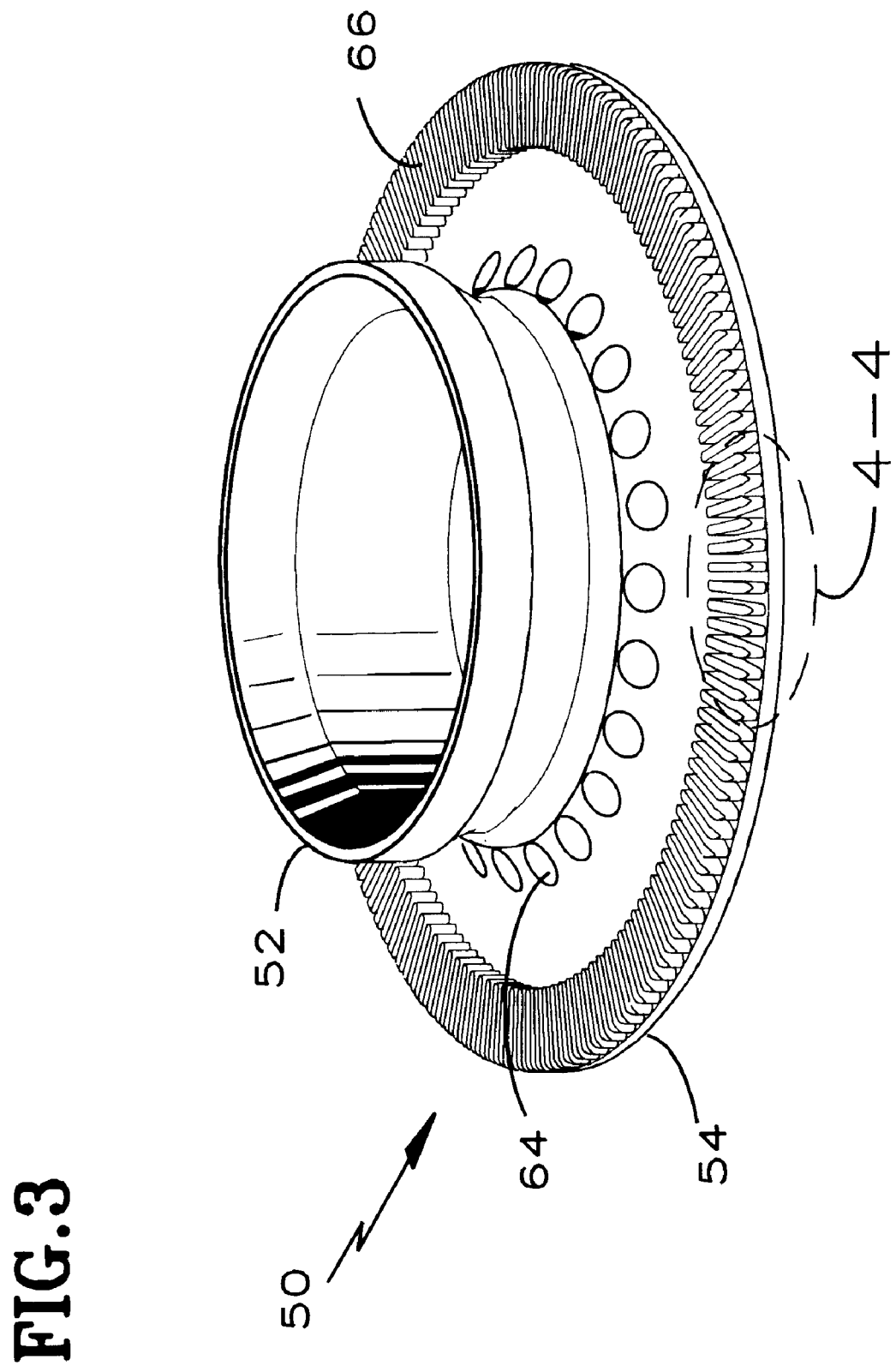
FIG. 3 is a perspective view of the fuel nozzle guide depicted in FIG. 2.

Referring to FIGS. 2, 3, and 4, ribs 66 are radially disposed about a circumferential portion of flange 54. Cooling air 61 passes through annular gap 62, then flows between the flange 54 and the heat shield 58 and then passes between the ribs 66 before entering the combustion chamber 34. Each of ribs 66 has a leading end 68 and a trailing end 70 wherein the leading end 68 and the trailing end 70 of each rib 66 are defined relative to the cooling airflow 61, and wherein the leading end 68 and trailing end 68 of each rib 60 are aligned along a radial direction about the flange 54.

In a preferred embodiment of the present invention, one hundred and forty four (144) ribs 66 are disposed about the flange 54. Each of the ribs 66 has a width of 0.0338 inches and a length of 0.25 inches, wherein the length is defined in a radial direction. Each of the ribs 66 also has a rounded-off leading end 68 and a rounded-off trailing end 70, wherein the radius of each of the rounded-offends is 0.0169 inches. Therefore, the aspect ratio for each of the ribs is approximately 0.14.

In addition, in a preferred embodiment as depicted in FIG. 4, the ribs 66 are separated from each other at their leading ends 68 at a distance of 0.032 inches, and at their trailing ends 70 at a distance of 0.025 inches; the spacing between the ribs 66 thereby defining cooling slots 72. The spacing of these cooling slots 72, in combination with the use of ribs 66 each having an aspect ratio of approximately 0.14, and in combination with the use of trailing ends 70 that are arcuate in shape, thereby allows the cooling airflow 61 to exit the cooling slots 72 smoothly without forming vortices upon passing the trailing ends 70 of the ribs 66.

In contrast, as depicted in FIGS. 5 and 6, the prior art fuel nozzle guide 73 having ribs 74 with aspect ratios on the order of 0.4, having ribs 74 with squared-off trailing ends 76, and having a cooling slot spacing 78, on average, of approximately 0.085, facilitates the formation of vortices 80 in the cooling airflow 82. As seen in FIG. 6, as the cooling airflow 82 exits the cooling slot 78, the cooling airflow 82 adjacent to the sides of the ribs 74 deflects away from the cooling slot 78 as the cooling airflow 82 clears the squared-off trailing end 76 of the ribs 74. This deflection is due to principles of fluid flow, and is well known in the art. Since the ribs 74 are relatively thick, the deflected cooling airflows 82 from adjacent cooling slots 78 eventually intersect at a point 84 spaced distally from the trailing ends 76 of the ribs 74.

As depicted in FIG. 6, the relatively large triangular region defined by the squared-off trailing end 76 of the ribs 74 and the angled cooling airflows 82 tends to cause the formation of vortices 80, thereby introducing a vacuum in which hot gases from the combustion chamber 34 may become entrained and possibly cause thermal distress to the heat shield 58.

In the present invention, as depicted in FIGS. 3 and 4, the thin nature of the ribs 66 relative to the ribs 74 of the prior art, coupled with the rounded-off trailing ends 70, results in an intersection point 86 for the deflected cooling airflow 61 which is further upstream than the corresponding intersection point 84 in the prior art. In addition, the area of the substantially triangular region defined by the trailing end 70 of the ribs 66 and the deflected cooling airflows 61 is significantly reduced. Therefore, by intersecting at a point 86 further upstream and proximal to the trailing end 70 of the ribs 66, the formation of vortices is thereby reduced, resulting in a lower risk of hot gases becoming entrained and causing thermal distress to the heat shield 58.

A fuel nozzle guide structure 50 including features of the present invention also presents advantages for the cooling of the nozzle guide structure 50 itself. Specifically, since there are one hundred and forty four ribs 66 disposed about the flange 54, convective cooling of the guide structure 50 is increased over the prior art due to the increase in surface area exposed to the cooling airflow 61.

In alternative embodiments of the present invention, the aspect ratio of the ribs 66 does not necessarily have to be approximately 0.14. In these alternative embodiments, the width of the ribs must be such that, in combination with the arcuate trailing ends, the cooling airflow intersects at a point spaced proximally to the trailing end such that vortices are not allowed to form such that they may entrain hot gases from the combustion chamber, thereby increasing the risk of causing thermal distress to the heat shield.

In yet other embodiments of the present invention, the leading ends of the ribs do not necessarily have to be arcuate in shape. In these embodiments, the leading ends may be conventionally squared-off. In still other embodiments, the number of ribs may be greater or less than one hundred and forty four. The number of ribs depends, in part, on the radius of the flange and the selected widths of the ribs and the cooling slots.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. In a combustor for a gas turbine engine, said combustor comprising a combustion chamber defined at one end thereof by a bulkhead having an opening therein, said bulkhead being thermally insulated from said combustion chamber by a bulkhead heat shield, said bulkhead further comprising a fuel nozzle and fuel nozzle guide structure therefor and a retainer for securing said fuel nozzle and said fuel nozzle guide structure within said bulkhead opening, said fuel nozzle guide comprising:

(a) an annular bushing sized for receiving said fuel nozzle, said bushing having a first end and a second end, said first end being connected to said retainer;

(b) a flange extending radially from said second end of said bushing, said flange having a proximal portion spaced proximal to said bashing, and a distal portion spaced distal from said bushing, said distal portion extending substantially parallel to said bulkhead heat shield; and (c) a plurality of radially extending ribs disposed about said distal portion of said flange, each of said ribs having leading ends and trailing ends, said trailing ends being arcuate in shape;

(d) wherein said ribs are of sufficient number to substantially eliminate vortices as film cooling air passes between said ribs.

2. A combustor as claimed in claim 1, further comprising:

a plurality of apertures in said proximal portion of said flange, whereby said apertures facilitate the introduction of air into said combustion chamber.

3. A combustor as claimed in claim 1, wherein:

said leading ends of said radially extending ribs are arcuate in shape.

4. A combustor as claimed in claim 1, wherein:

each of said radially extending ribs has an aspect ratio from 0.1 to 0.2.

5. A combustor as claimed in claim 1, wherein:

144 of said radially extending ribs are disposed about said distal portion of said flange.

6. In a combustor for a gas turbine engine, said combustor having a bulkhead, said bulkhead having an opening therein, said bulkhead being thermally insulated by a bulkhead heat shield, said bulkhead further comprising a fuel nozzle and fuel nozzle guide structure therefor and a retainer for securing said fuel nozzle and said fuel nozzle guide structure within said bulkhead opening, said fuel nozzle guide comprising:

(a) an annular bushing sized for receiving said fuel nozzle, said bushing having a first end and a second end, said first end being connected to said retainer;

(b) a flange extending radially from said second end of said bushing, said flange having a proximal portion spaced proximal to said bushing, and a distal portion spaced distal from said bushing, said distal portion extending substantially parallel to said bulkhead heat shield; and (c) a plurality of radially extending ribs disposed about said distal portion of said flange, each of said ribs having leading ends and trailing ends, said trailing ends being arcuate in shape, wherein said arcuate trailing ends facilitates a reduction in film cooling air vortices as film cooling air passes between said ribs.

7. A combustor as claimed in claim 6, further comprising:

a plurality of apertures in said proximal portion of said flange, whereby said apertures facilitate the introduction of air into said combustor.

8. A combustor as claimed in claim 6, wherein:

said leading ends of said radially extending ribs are arcuate in shape.

9. A combustor as claimed in claim 6, wherein:

each of said radially extending ribs has an aspect ratio from 0.1 to 0.2.

10. A combustor as claimed in claim 6, wherein:

144 of said radially extending ribs are disposed about said distal portion of said flange.

11. In a combustor for a gas turbine engine, a fuel nozzle guide comprising:
   (a) an annular bushing sized for receiving a fuel nozzle, said bushing having a first end and a second end, said first end being connected to means for securing said fuel nozzle guide within said combustor;
   (b) a flange extending radially from said second end of said bushing, said flange having a proximal portion spaced proximal to said bushing, and a distal portion spaced distal from said bushing; and
   (c) a plurality of radially extending ribs disposed about said distal portion of said flange, each of said ribs having leading ends and trailing ends, said trailing ends being arcuate in shape, wherein said arcuate trailing ends facilitates a reduction in film cooling air vortices as film cooling air passes between said ribs.

12. A fuel nozzle guide as claimed in claim 11, further comprising: a plurality of apertures in said proximal portion of said flange, whereby said apertures facilitate the introduction of air into said combustor.

13. A fuel nozzle guide as claimed in claim 11, wherein:
   said leading ends of said radially extending ribs are arcuate in shape.

14. A fuel nozzle guide as claimed in claim 11, wherein:
   each of said radially extending ribs has an aspect ratio from 0.1 to 0.2.

15. A fuel nozzle guide as claimed in claim 11, wherein:
   144 of said radially extending ribs are disposed about said distal portion of said flange.

\* \* \* \* \*

UNITED STATES PATENT AND TRADEMARK OFFICE
CERTIFICATE OF CORRECTION

PATENT NO. : 6,032,457
DATED : March 7, 2000
INVENTOR(S) : McKinney, et al

It is certified that error appears in the above-identified patent and that said Letters Patent is hereby corrected as shown below:

Title page,
[*] delete "617" and insert -- 58 --.

Signed and Sealed this

Sixteenth Day of October, 2001

Attest:

*Attesting Officer*

NICHOLAS P. GODICI
*Acting Director of the United States Patent and Trademark Office*